United States Patent
Otting et al.

(10) Patent No.: US 7,106,711 B2
(45) Date of Patent: Sep. 12, 2006

(54) METHOD AND APPARATUS FOR REDUCING THE IMPACT OF CELL RESELECTION OF GPRS/EDGE DATA RATES

(75) Inventors: Marcia J. Otting, Mundelein, IL (US); Mark E. Pecen, Palatine, IL (US); Stephen Andrew Howell, Barnwood (GB)

(73) Assignee: Motorola, Inc., Schaumburg, IL (US)

( * ) Notice: Subject to any disclaimer, the term of this patent is extended or adjusted under 35 U.S.C. 154(b) by 904 days.

(21) Appl. No.: 09/875,627

(22) Filed: Jun. 6, 2001

(65) Prior Publication Data

US 2002/0186675 A1   Dec. 12, 2002

(51) Int. Cl.
*H04Q 7/00* (2006.01)
(52) U.S. Cl. ............... 370/331; 370/337; 370/347; 370/470; 455/436
(58) Field of Classification Search ............... 370/328, 370/331–334, 470–472, 347, 337; 455/436–439
See application file for complete search history.

(56) References Cited

U.S. PATENT DOCUMENTS

| | | | |
|---|---|---|---|
| 5,530,693 A * | 6/1996 | Averbuch et al. | 370/331 |
| 5,864,578 A * | 1/1999 | Yuen | 375/143 |
| 6,064,678 A * | 5/2000 | Sindhushayana et al. | 370/470 |
| 6,208,663 B1 * | 3/2001 | Schramm et al. | 370/465 |
| 6,327,256 B1 * | 12/2001 | Paivike et al. | 370/337 |
| 6,463,055 B1 * | 10/2002 | Lupien et al. | 370/353 |
| 6,532,363 B1 * | 3/2003 | Pussinen | 455/435.1 |
| 6,611,506 B1 * | 8/2003 | Huang et al. | 370/329 |
| 6,665,538 B1 * | 12/2003 | Hunte | 455/446 |
| 6,724,740 B1 * | 4/2004 | Choi et al. | 370/335 |

OTHER PUBLICATIONS

GSM 04.60, "Digital cellular telecommunications system (Phase 2+); General Packet Radio Service (GPRS); Mobile Station (MS)—Base Station System (BSS) interface; Radio Link Control/Medium Access Control (RLC/MAC) protocol," (European Telecommunications Standards Institute (ETSI); European Standard (Telecommunications series)).

3GPP 24.007, "3rd Generation Partnership Project (3GPP); Technical Specification Group Core Network (TSG CN); Mobile radio interface radio network signally layer 3; General aspects," (3rd Generation Partnership Project; Telecommunications Standard).

3GPP 24.008, "3rd Generation Partnership Project (3GPP); Technical Specification Group Core Network (TSG CN); Universal Mobile Telecommunications Systems (UMTS); Mobile radio interface layer 3 specification, Core Network Protocols—Stage 3," (3rd Generation Partnership Project; Telecommunications Standard).

GSM 05.08, "Digital cellular telecommunications system (Phase 2+); Radio Subsystem Link Control," European Telecommunications Standards Institute (ETSI); European Standard (Telecommunications series)).

* cited by examiner

*Primary Examiner*—Seema S. Rao
*Assistant Examiner*—Shick Hom
(74) *Attorney, Agent, or Firm*—David S. Noskowicz

(57) ABSTRACT

A method and apparatus for cell reselection during transmission of data between a mobile station and a network through a first cell of a plurality of cells, each of the plurality of cells defining a corresponding radio coverage area. A control stack (305) organizes the data within frames during the transmission of data, and an adjustment module (324) adjusts a size of the frames prior to detection that a second cell of the plurality of cells is a candidate for reselection.

17 Claims, 6 Drawing Sheets

-- prior art --

-- prior art --

METHOD AND APPARATUS FOR REDUCING THE IMPACT OF CELL RESELECTION OF GPRS/EDGE DATA RATES

FIELD OF THE INVENTION

The present invention relates generally to cellular packet data networks, and in particular, the present invention relates to a method and apparatus for maximizing data throughput during reselection between adjacent cells of a cellular packet data network.

BACKGROUND OF THE INVENTION

The Global System for Mobile Communications (GSM) General Packet Radio Service (GPRS) and Enhanced Data for Global Evolution (EDGE) is intended to enable a service subscriber to send and receive data in an end-to-end packet transfer mode without utilization of network resources in the circuit-switched mode. GPRS, EDGE and 3rd Generation (3G) packet radio services permit the efficient use of radio and network resources when data transmission characteristics are i) packet based, ii) intermittent and non-periodic, iii) possibly frequent, with small transfers of data, e.g. less than 500 octets, or iv) possibly infrequent, with large transfers of data, e.g. more than several hundred kilobytes. User applications may include Internet browsers, electronic mail and so on.

FIG. 1 is a schematic diagram of a typical cellular communication system for use in explaining the operation of the present invention. As illustrated in FIG. 1, a cellular communication system 100 includes a number of cells 102–116, each defining a radio coverage area established by a fixed site base station located within each cell. For example, as illustrated in FIG. 1, cell 102 defines the radio coverage area established by a base station 118 located in cell 102, and similarly, each of the remaining cells 104–116 define an associated radio coverage area established by a corresponding base station (not shown) located within each of cells 104–116.

As a mobile station, such as a cellular telephone device, for example, travels with a user from position x to position y in cellular communication system 100, the mobile station continuously monitors the signal characteristics from the base stations of cells 102–116 and, based on certain selection criteria, selects a cell from which to receive and transmit packet data with a network 120 through the associated base station. For example, while the mobile station is positioned in cell 114, if the signal characteristics from cell 114 are such that, based on the selection criteria, cell 114 is selected as the "best" coverage area, cell 114 is considered to be the "serving cell", or cell from which the mobile station transmits and receives packet data.

The mobile station continues to monitor the signal characteristics from cells 102–116, and, as illustrated in FIG. 1, as the mobile station subsequently moves along the marked path from position x to position y, the mobile station moves from the coverage area associated with cell 114 into the coverage area associated with other cells, such as cells 116 and 106 for example. Once the signal characteristics from another cell, cell 116 for example, are such that cell 116 is considered the best cell, the mobile station reselects cell 116 as the serving cell, until the signal characteristics from another cell, cell 106 for example, are such that cell 106 is considered the best cell, and the mobile station reselects cell 106 as the serving cell, and so on.

Since a user of a mobile station may be traversing the radio coverage area associated with more than one of cells 102–116, a known ordinal integrity mechanism, specified in the current GSM specification, GSM 04.60, "Digital cellular telecommunications system (Phase 2+); General Packet Radio Service (GPRS); Mobile Station (MS)—Base Station System (BSS) interface; Radio Link Control/Medium Access Control (RLC/MAC) protocol", (European Telecommunications Standards Institute (ETSI), European Standard (Telecommunications Series), is incorporated into packet data services to ensure the ordinal integrity of data flow when a mobile station leaves the coverage area of one cell and enters a new cell.

FIG. 2 is a schematic diagram of a partial representation of a data plane for GPRS/EDGE. As illustrated in FIG. 2, both a mobile station 200 and a network 202 include equivalent hierarchically related control layers, such as a logical link control (LLC) layer 204, a radio link control (RLC) layer 206, a medium access control layer 208 and a physical layer 210. Packet data that is transmitted between mobile station 200 and network 202 is organized at logical link control layer 204 for transmission within logical link control frames, with each logical link control frame varying in size up to 1530 octets. As one logical link control frame logically propagates downward through the data plane, it is divided into multiple radio link control data blocks, with each radio link control data block being 22 to 54 octets. Each radio link control data block is in turn interleaved over four physical layer bursts with added redundancy.

As illustrated in FIGS. 1 and 2, if mobile station 200 is located at position x and is sending GPRS/EDGE data to network 202 via the serving cell, i.e., cell 114, cell 114 receives and acknowledges all of the radio link control data blocks that comprise the logical link control frames corresponding to the GPRS/EDGE data transmitted to network 202. If, while serving cell 114 is receiving a logical link control frame from mobile station 200, mobile station 200 reselects to a new serving cell, serving cell 116 for example, mobile station 200 reselects to cell 116, aborting the current temporary block flow on cell 114 and re-establishing the temporary block flow on cell 116, which now becomes the serving cell.

According to the known ordinal integrity mechanism, once the temporary block flow is re-established on new serving cell 116, mobile station 200 reorganizes its radio link control data block transmission window and begins by sending the first radio link control data block in the last unacknowledged logical link control frame. As a result, all of the radio link control blocks corresponding to the last logical link control frame being transmitted while cell 114 was the serving cell would have to be re-transmitted, despite the fact that some of those radio link control blocks may have been correctly received in serving cell 114. For example, if 53 radio link control blocks were needed to transmit a single logical link control frame, and radio link control blocks 1–50 were successfully transmitted up to the point at which reselection is performed, radio link control blocks 1–50 would be discarded and would therefore have to be retransmitted to the new selected cell to continue transmission of the logical link control frame.

In this way, in an environment in which rapid cell reselection is likely to occur, such as a congested urban environment for example, the known ordinal integrity mechanism produces a severe reduction in data throughput because of the periodic discarding of properly received information upon each reselection to a new serving cell.

Accordingly, what is needed is an improved method and apparatus for reducing the impact of cell reselection on user data transfer rates.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify like elements, and wherein:

DETAILED DESCRIPTION OF THE PREFERRED EMBODIMENT

The present invention is a method and apparatus for reducing the effects of cell reselection on user data throughput rates. Once a cell other than the currently selected cell, or serving cell, becomes a candidate for reselection, a reselection pending signal is transmitted from a physical layer to an adjustment module, which then stores the current logical link control frame size in memory. The adjustment module transmits a predetermined logical link control frame size to a logical link control layer so that transmission of packet data is performed using the predetermined logical link control frame size. Packet data is then transmitted using the predetermined logical link control frame size until a reselection complete signal, indicating that the reselection to the other cell is complete, or a reselection abort signal, indicating that the reselection to the other cell has been aborted, is received by the adjustment module. When a reselection complete signal is received, packet data is transmitted to the other cell using the previously stored logical link control frame size. When the reselection aborted signal is received, transmission of packet data to the current selected cell continues using the stored logical link control frame size. As a result, by dynamically adjusting the logical link control frame size in a data transfer session prior to reselection to another cell, the present invention reduces the impact of cell reselection on user data transfer rates.

Figure 3:
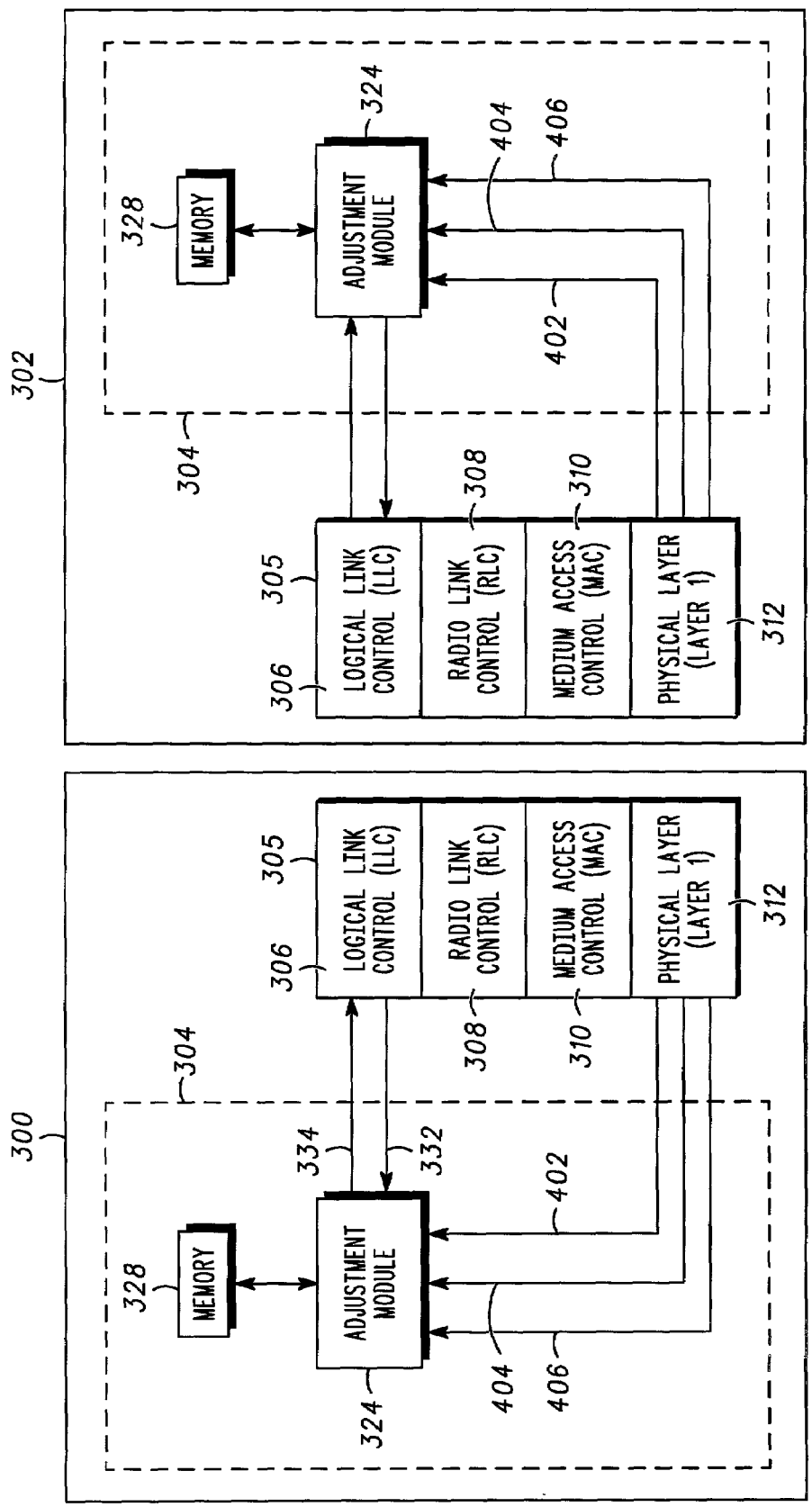
FIG. 3 is a schematic diagram of an apparatus for maximizing data throughput during cell reselection in a communication system according to the present invention.

FIG. 3 is a schematic diagram of an apparatus for maximizing data throughput during cell reselection in a communication system according to the present invention. As illustrated in FIG. 3, a communication system according to the present invention includes a mobile station 300, such as a cellular telephone, paging device, personal digital assistant (PDA), or similar wireless device, sending data to and receiving data from a network 302. Mobile station 300 and network 302 include an equivalent logical link control adjustment unit 304, along with a control layer 305 having equivalent hierarchically related control layers, such as a logical link control (LLC) layer 306, a radio link control (RLC) layer 308, a medium access control (MAC) layer 310 and a physical layer 312. Logical link control adjustment unit 304 includes a corresponding adjustment module 324 for adjusting the length of the logical link control frame, along with a corresponding memory 328, which is described in is detail below.

Packet data that is transmitted between mobile station 300 and network 302 via a serving cell is organized at logical link control layer 306 for transmission within logical link control frames, with each logical link control frame varying in size up to 1530 octets. As a logical link control frame logically propagates downward through the data plane, the logical link control frame is divided into multiple radio link control data blocks, with each radio link control data block being 22 to 54 octets in length. Each radio link control data block is in turn interleaved over four physical layer bursts with added redundancy. Radio link control layer 308 is primarily involved with error correction at the radio layer to absorb the periodic errors which result from the fading channel, in addition to handling certain aspects of GPRS/EDGE data transfer setup and teardown.

In addition, GPRS/EDGE data frames are directed from radio link control layer 308 to respective medium access control (MAC) layer 310, which organizes the transmission and reception of packet-based information onto and from respective physical layer 312, primarily including logic by which mobile station 300 is informed of its right to transmit at a given point. Medium access control layer 310 is also responsible for the recognition of messages addressed to mobile station 300 on the downlink side. Finally, physical layer 312 provides interface between radio frequency hardware and a call processor (not shown), including scheduling of reception and transmission of physical data, receiver gain control, transmitter power control, signal level measurements, and so forth.

Figure 4:
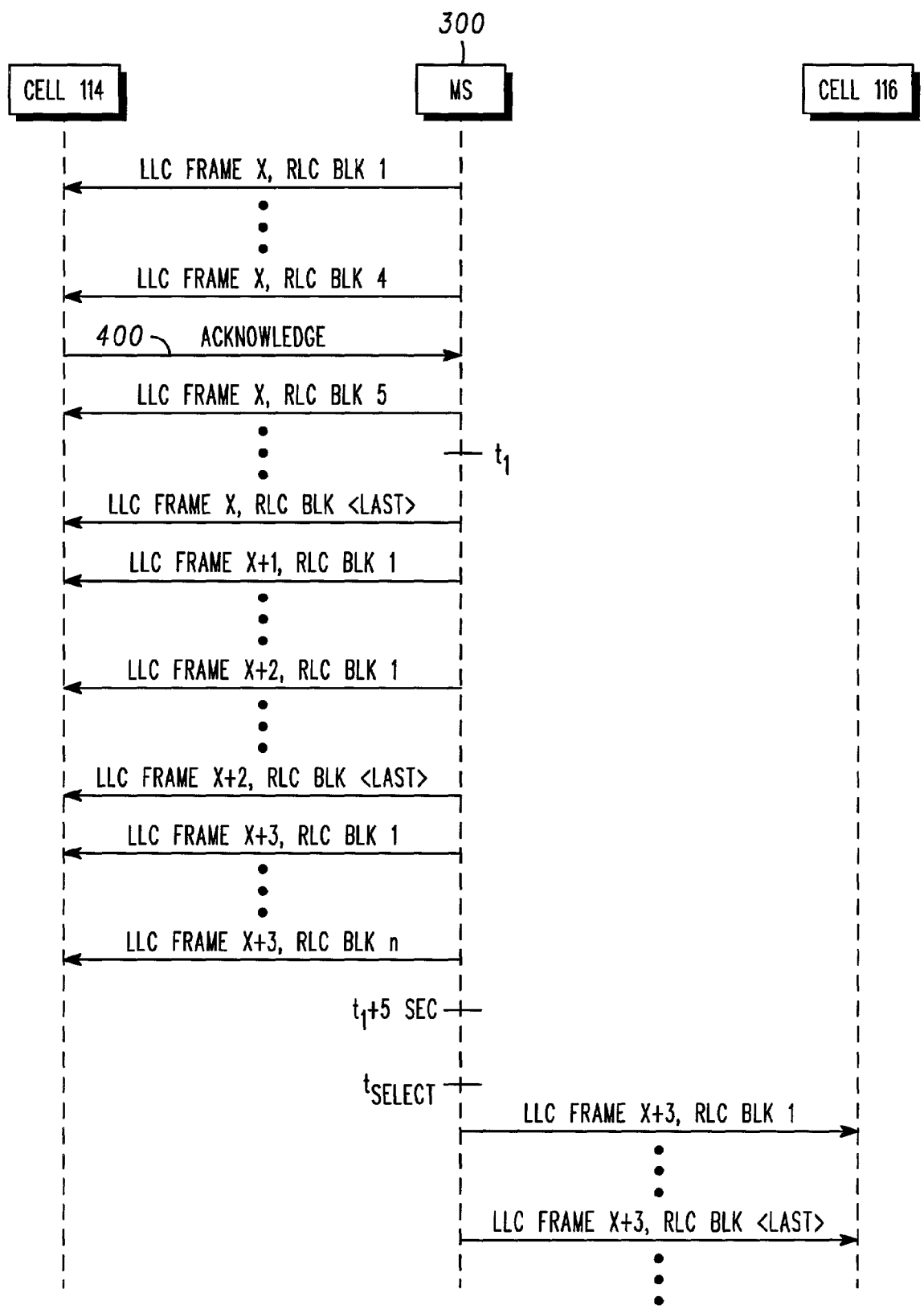
FIG. 4 is a data flow diagram of data throughput during cell reselection in a communication system according to the present invention.

FIG. 4 is a data flow diagram of data throughput during cell reselection in a communication system according to the present invention. Although FIG. 4 illustrates the flow of data using the method and apparatus of the present invention when mobile station 300 is sending data to network 302, it is understood that, as described above, network 302 includes hierarchical equivalents for each layer 306–312 of mobile station 300, along with correspondingly equivalent logical link control adjustment unit 304, so that the method and apparatus of the present invention would be equivalent when network 302 is sending data to mobile station 300. As a result, a separate description of data transfer from network 302 to mobile station 300 has been omitted merely for brevity. However, during a downlink transmission from network 302 to mobile station 300 in a network controlled reselection environment, the network 302 determines when mobile station 300 will reselect to another cell using the power-measurement information sent from mobile station 300 to make a determination as to which cell mobile station 300 will reselect to and when the reselection will take place. This power measurement data would then be considered the reselection pending signal, as well as the reselection aborted signal, which will be described below.

Figure 1:
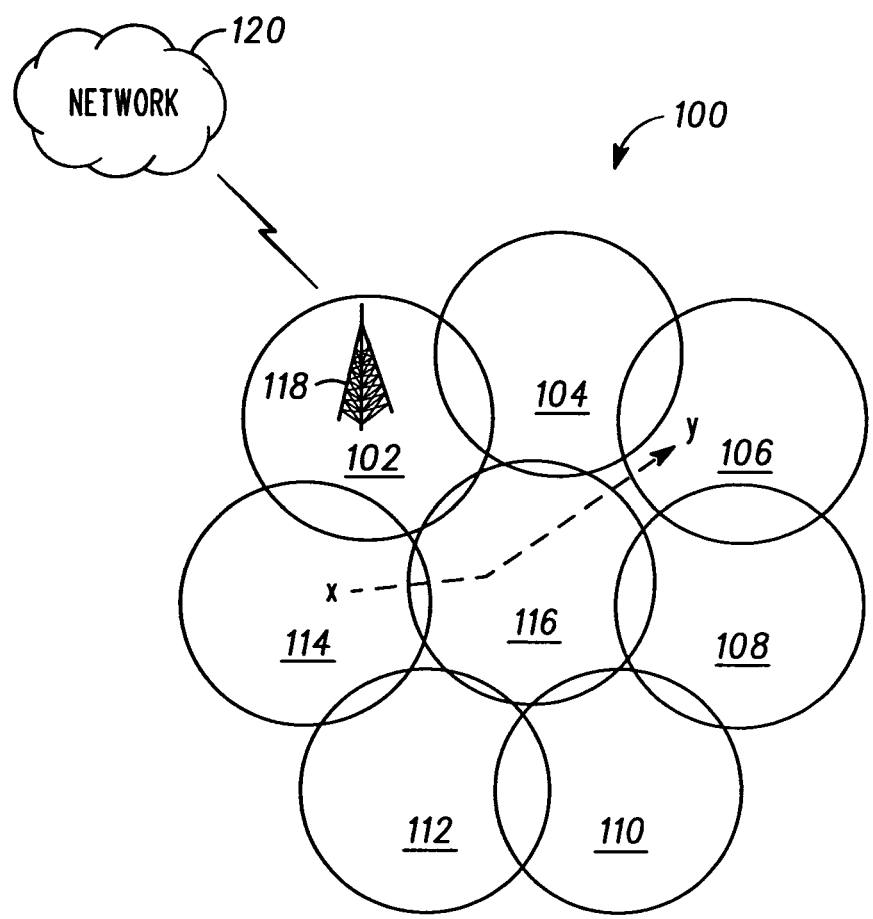
FIG. 1 is a schematic diagram of a typical cellular communication system for use in explaining the operation of the present invention.
Figure 2:
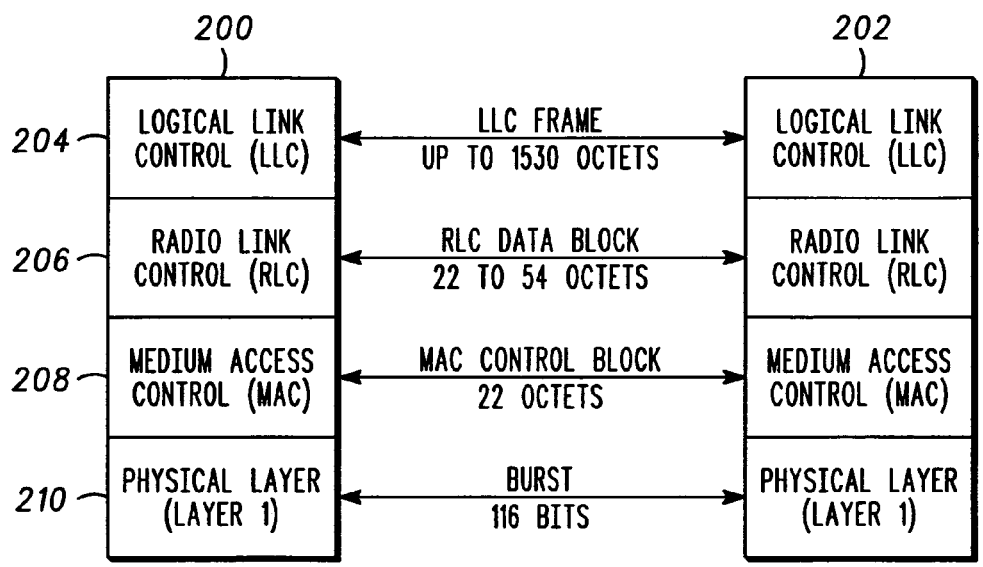
FIG. 2 is a schematic diagram of a partial representation of a data plane for GPRS/EDGE.

As illustrated in FIGS. 1, 3 and 4, when cell 114 is selected as the serving cell by mobile station 300, mobile station 300 sends packet data to network 302 via cell 114, while at the same time, mobile station 300 continues to monitor signal characteristics from cells 102–116. The packet data sent by mobile station 300 is organized at logical link control layer 304 of mobile station 300 for transmission to cell 114 within logical link control frames, with each logical link control frame varying in size up to 1530 octets. As one logical link control frame logically propagates downward through the data plane, it is divided at radio link control layer 308 into multiple radio link control data blocks, with each radio link control data block being 22 to 54 octets in length. Each radio link control data block is in turn interleaved over four physical layer bursts at physical layer 312 with added redundancy.

Although the length of the logical link control frame varies, if a logical link control frame has a length of 1000 octets, for example, 53 radio link control data blocks would be required to send the logical link control frame in a channel coding scheme CS-1. Assuming that all block periods in the physical channel domain corresponding to physical layer 312 that are intended for data transmission are schedulable, mobile station 300 would then transmit the logical link control frame to cell 114 within 53 radio link control blocks, with cell 114 sending an acknowledgement message to mobile station 300 each time after cell 114 receives four radio link control blocks, corresponding to the four physical layer bursts.

In particular, as illustrated in FIG. 4, when packet data is being transmitted from mobile station 300 to selected cell 114 in logical link control frame x, and logical link control frame x has a length of 1000 octets, for example, mobile station 300 begins by transmitting radio link control blocks 1–4 associated with logical link frame x to cell 114. Once radio link control blocks 1–4 have been received at cell 114, cell 114 transmits an acknowledgement message 400 to mobile station 300 acknowledging receipt of radio link control blocks 1–4. Upon receipt of acknowledgement message 400, mobile station 300 transmits a next portion of logical link control frame x within radio link control blocks 5–8, which are then acknowledged when received by cell 114, and so forth The process continues until the last radio link control block, i.e., radio link control block <last>, associated with logical link control frame x is sent, and all fifty-three radio link control blocks necessary to transmit logical link control frame x have been acknowledged by cell 114.

Once transmission of logical link control frame x is completed, mobile station 300 transmits a next logical link control frame x+1, if one is available for transmission, using whatever number of radio link control blocks are needed, which of course is again dependent upon the length of logical link control frame x+1. When transmitting next logical link control frame x+1, mobile station 300 begins by transmitting radio link control blocks 1–4 associated with logical link control frame x+1 to cell 114, with cell 114 acknowledging receipt each time after four radio link control blocks are received as described above, until the last radio link control block <last corresponding to logical link control frame x+1 is sent. Once transmission of logical link control frame x+1 is completed, mobile station 300 transmits a next logical link control frame x+2, if a next one is available for transmission, with cell 114 acknowledging receipt after four radio link control blocks are received, and so forth. As a result, the data transmission process continues until the transmission of packet data by mobile station 300 is either completed, interrupted or aborted. Once the transmission of the packet data is either completed, interrupted, or aborted, the reselection process is terminated.

At some point during this transmission of packet data, mobile station 300 will begin to detect that another cell, cell 116 for example, is a candidate for reselection as the serving cell. This detection could occur at any time during packet data transmission, such as, for example, as illustrated in FIG. 4, at time $t_1$, which is prior to transmission of the last radio link control block <last> corresponding to logical link control frame x. As a means for minimizing unnecessary reselections, the current GSM specification, GSM 05.08, "Digital Cellular Telecommunications System (Phase 2+); Radio Subsystem Link Control", (European Telecommunications Standards Institute (ETSI), European Standard (Telecommunications Series), requires an adjacent cell to have better signal quality for a period of at least five seconds prior to reselecting to that cell. The present invention takes advantage of this five second interval prior to reselection as a logical input for dynamically changing the size of the logical link control frame during a data transfer session, using the method and apparatus of the present invention. As a result, by dynamically changing the size of the logical link control frame during a data transfer session, the present invention maximizes data throughput.

In particular, as illustrated in FIGS. 3 and 4, according to the present invention, once mobile station 300 detects that cell 116 is a candidate for reselection at time $t_1$, physical layer 312 informs logical link control adjustment unit 304 by sending a reselection pending signal 402 to adjustment module 324. According to the present invention, the timing for sending reselection pending signal 402 coincides with the start of the five-second interval, i.e., time $t_1$. Upon receipt of reselection pending signal 402, logical link control layer 306 transmits a current logical link control frame size signal 332 informing adjustment module 324 of the size of the logical link control frame that is not yet completely transmitted, which in the example illustrated in FIG. 4 is the size of logical link control frame x. Adjustment module 324 then stores the frame size of logical link control frame x as the current logical link control frame size in memory 328. Adjustment module 324 then sets the logical link control frame length to a predetermined minimum value, which, according to a preferred embodiment of the present invention would be 100 octets, by sending a predetermined minimum value signal 334 to logical link control layer 306. Although the present invention uses 100 octets as the predetermined value for the logical link control frame length, it is understood that the present invention is not limited to using 100 octets as the predetermined logical link control frame length, and that the present invention is intended to include the use of other values for the logical link control frame length.

In this way, according to the present invention, mobile station 300 operates in a normal frame-size state until the logical link control frame length is set to the predetermined minimum value at logical link control layer 306. However, once the logical link control frame length is set to the predetermined minimum value, mobile station 300 transitions from the normal frame-sized state to a minimum frame-size state.

When mobile station 300 is in the minimum frame-size state, the next logical link control frame x+1 is then transmitted from mobile station 300 to cell 114, as described above, using the pre-determined minimum logical control link length and corresponding number of radio link control blocks. The number of radio link control blocks is dependent upon the channel coding scheme that is used, and is equal to (LLC) payload size/(RLC data block payload size)+remainder of (LLC payload size) mod (RLC data block payload size). Therefore, with a logical link control frame length of 100 octets, the number of radio link control blocks needed in a CS-1 coding scheme would be equal to six radio link control data blocks. As a result, the number of radio link control blocks required for transmission of the data would potentially be reduced during the minimum frame-size state from 53 radio link control blocks, assuming a frame length of 100 octets, to six radio link control blocks.

Once the last radio link control block associated with next logical link control frame x+1 has been sent, mobile station 300 sends a next logical link control frame x+2, using the predetermined minimum logical control link length and corresponding number of radio link control blocks, with cell 114 acknowledging receipt of the radio link control blocks, until the last radio link control block <last> corresponding to logical link control frame x+2 is sent. Mobile station 300 then continues by transmitting a next logical link control frame x+3 using the predetermined minimum logical control link length and corresponding number of radio link control blocks, with cell 114 acknowledging receipt of the radio link control blocks as described above, until the last radio link control block <last> corresponding to logical link control frame x+3 is sent, and so on.

As illustrated in FIGS. 3 and 4, at time $t_{select}$ mobile station 300 has aborted the current temporary block flow on cell 114 and re-established the temporary block flow on cell 116, so that mobile station 300 has reselected to the new serving cell, cell 116. As a result, a reselection complete signal 404 is transmitted from physical layer 312 to adjustment module 324 of logical link control adjustment unit 304 at time $t_{select}$.

Since reselection complete signal 404 is received during transmission of a logical link control frame, logical link control frame x+3, for example, mobile station 300 respects the known ordinal integrity mechanism, specified in the current GSM specification, GSM 04.60, "Digital cellular telecommunications system (Phase 2+); General Packet Radio Service (GPRS); Mobile Station (MS)—Base Station System (BSS) interface; Radio Link Control/Medium Access Control (RLC/MAC) protocol", (European Telecommunications Standards Institute (ETSI), European Standard (Telecommunications Series), so that once the temporary block flow is re-established on new serving cell 116, mobile station 300 re-organizes its radio link control data block transmission window by re-setting the logical link control frame size to the value previously stored in memory 328. Mobile station 300 then sends the first radio link control block from the last unacknowledged logical link control frame, i.e., logical link control frame x+3, using the previously stored logical link control frame size.

As a result, as illustrated in FIG. 4, mobile station 300 begins sending the last unacknowledged logical link control frame x+3 to cell 116, resending all associated radio link control blocks, starting with the first, using the previously stored logical link control frame size, i.e., 1000 octets, and so forth, placing mobile station 300 back to a normal framesize state.

Although the reselection shown in FIG. 4 takes place after the expiration of the five-second warning, $t_1$+5 sec., it is possible that for certain reasons, such as loss in signal strength, for example, the reselection does not take place either within the five second warning, $t_1$+5 sec., or within a defined time period after the five second warning as defined in the system requirements. Therefore, according to the present invention, if reselection is not completed within the five-second warning period, $t_1$+5 sec., or is aborted for any other reason as set forth in the system requirements, a reselection aborted signal 406 (FIG. 3) is transmitted from physical layer 312 to adjustment module 324 of logical link control adjustment unit 304. Upon receipt of reselection aborted signal 406 at adjustment module 324, mobile station 300 re-organizes its radio link control data block transmission window by re-setting the logical link control frame size to the value previously stored in memory 328, and sends the first radio link control block in the last unacknowledged logical link control frame, i.e., logical link control frame x+3, using the previously stored logical link control frame size, and continues transmitting the packet data to the last selected cell, i.e., cell 114.

Although the present invention has been described as setting the logical link control frame length to 100 octets, it is understood that, according to the present invention, any predetermined size for the logical link control frame length could be used. For example, a minimum frame size may be utilized which is based on a reasonable assumption relative to the payload size of a radio link control block on a per channel coding scheme basis and a statistically-determined value for frequently-interchanged packets, e.g., just large enough to accommodate a frequently-transmitted control packet at the transport layer. Alternately, the radio link control frame length could be adjusted to a "largest possible" size based on the estimated time remaining in the current cell, which in turn could be determined by signal strength, for example, the total amount of data left to be transferred in the temporary block flow, or a combination of these or other factors.

Figure 6:
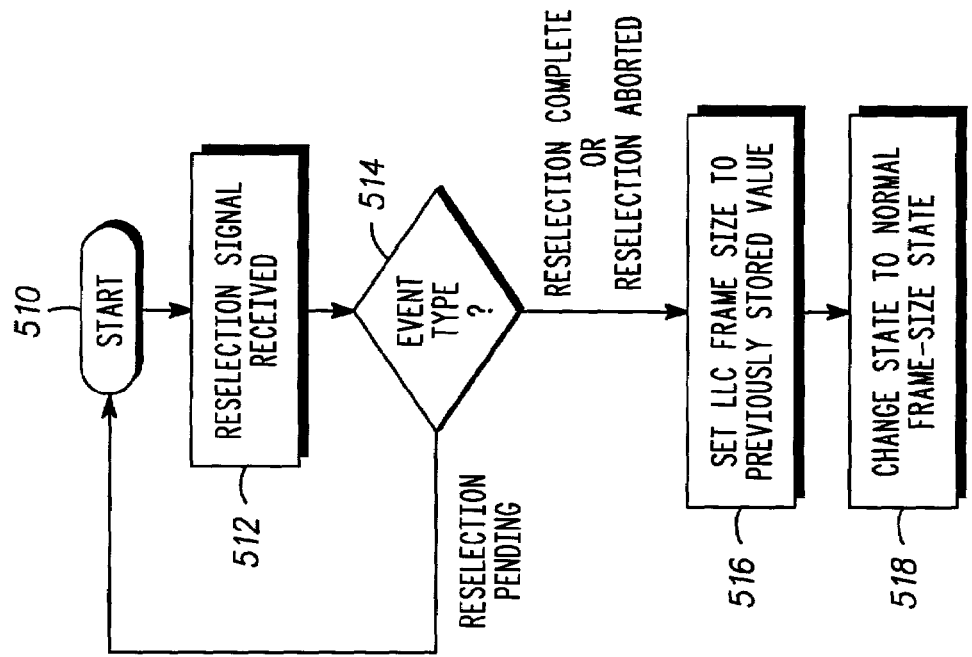
FIGS. 5 and 6 are flowcharts illustrating a method for dynamically adjusting a logical link control frame size, according to the present invention.
Figure 5:
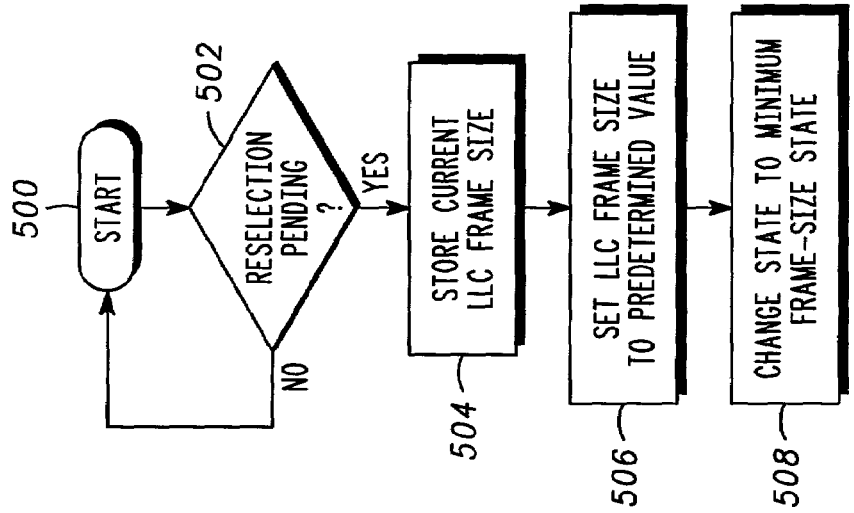

FIGS. 5 and 6 are flowcharts illustrating a method for dynamically adjusting a logical link control frame size, according to the present invention. As illustrated in FIGS. 4 and 5, when in the normal frame-size state, Step 500, adjustment module 324 determines whether reselection pending signal 402 has been received, Step 502. Once reselection pending signal is received, yes in Step 502, adjustment module 324 stores the current logical link control frame size in memory 328, Step 504, and sets the logical link control frame size to the predetermined value, Step 506. Upon completion of Steps 504–506, mobile station 300 transitions to the minimum frame-size state, Step 508.

As illustrated in FIGS. 4 and 6, when in the minimum frame-size state, Step 510, once one of reselection signals 402–406 are received, Step 512, adjustment module 324 determines whether it is reselection pending signal 402, reselection complete signal 404, or reselection aborted signal 406, Step 514. If reselection pending signal 402 is received, the process returns to Step 510, and adjustment module 324 waits for receipt of reselection signals 402–406, Step 512. If it is determined in Step 514 that reselection complete signal 402 or reselection aborted signal 406 are received, adjustment module 324 sets the logical link control frame size to the previously stored value, Step 516, and mobile station 300 then transitions to the normal frame-size state, Step 518.

Figure 7:
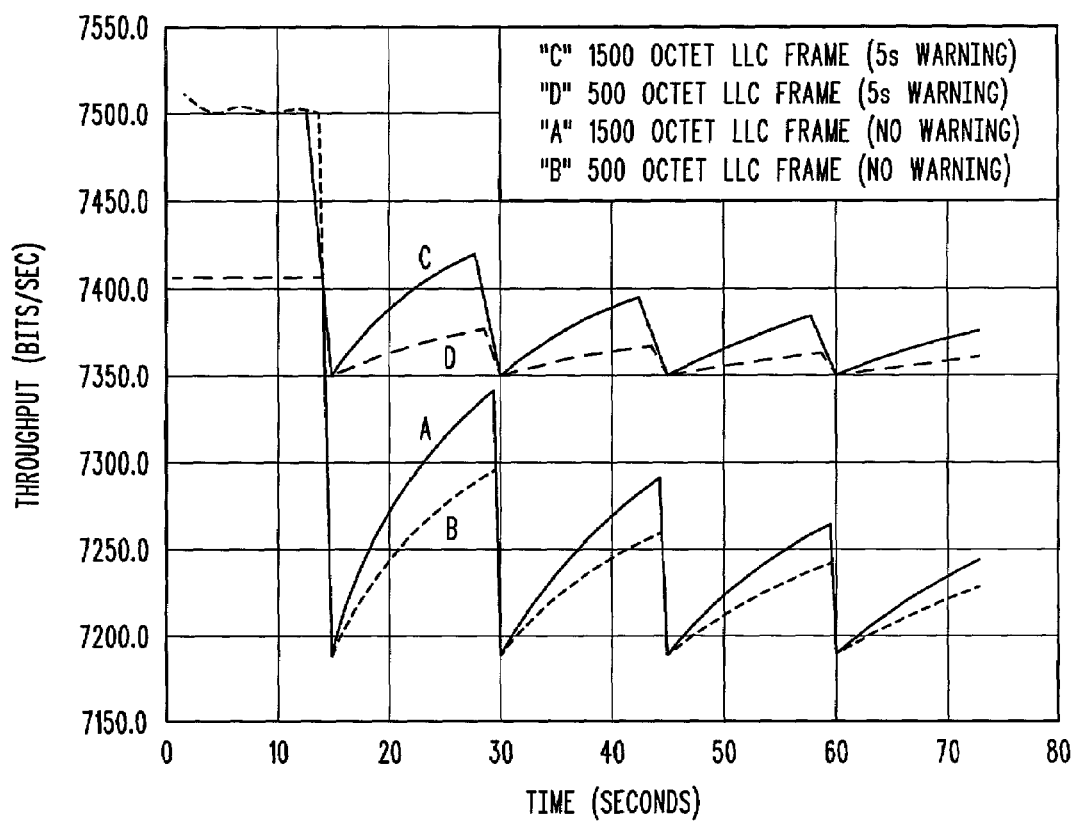
FIG. 7 is a graphical view of the effect on real user data throughput of varying the length of the logical link control frame, according to the present invention.

FIG. 7 is a graphical view of the effect on real user data throughput of varying the length of the logical link control frame, according to the present invention. Plots illustrating the cumulative throughput rates for 500 and 1500 octet logical link control frames, both with and without the method and apparatus of the present invention, are shown, in a simulation of the cumulative effects on user data throughput of reselections every fifteen seconds. In particular, as illustrated in FIG. 7, the throughput resulting when a 500 and a 1500 octet logical link control frame is utilized without the method and apparatus of the present invention, represented by plots A and B respectively, initially drops to less than 7,200 bits/sec. By comparison, the throughput resulting when a 500 and a 1500 octet logical link control frame is utilized with the method and apparatus of the present invention, represented by plots C and D respectively, drops to 7,350 bits/sec.

Therefore, as can be seen from the simulation in FIG. 7, by dynamically adjusting the logical link control frame size in a data transfer session during the five-second warning period prior to reselection, the present invention reduces the impact of cell reselection on user data transfer rates.

While a particular embodiment of the present invention has been shown and described, modifications may be made. It is therefore intended in the appended claims to cover all such changes and modifications that fall within the true spirit and scope of the invention.

What is claimed is:

1. A mobile station transmitting and receiving data through a first cell of a plurality of cells, each of the plurality of cells defining a corresponding radio coverage area, the mobile station comprising:
   a control stack organizing data within frames during transmission of data; and
   an adjustment module adjusting a size of the frames prior to detection by the mobile station that a second cell of the plurality of cells is a candidate for reselection by the mobile station,
wherein, in response to the mobile station detecting that the second cell is a candidate for reselection, the control stack informs the adjustment module of a first frame size corresponding to transmission within the first cell and the adjustment module sets the size of the frames to a second frame size.

2. The mobile station of claim 1, wherein the second frame size is 100 octets.

3. The mobile station of claim 1, wherein the frames are reset to the first frame size in response to a termination of a reselection process establishing the second cell as a serving cell.

4. The mobile station of claim 3, wherein the termination of the reselection process corresponds to one of completion of reselection to the second cell, aborting of reselection to the second cell, and establishment of the second cell as the serving cell not being completed within a predetermined time period.

5. The mobile station of claim 4, wherein, in response to the termination of the reselection process corresponding to completion of reselection to the second cell, data is transmitted through the second cell.

6. The mobile station of claim 5, wherein, in response to the termination of the reselection process corresponding to either aborting of reselection to the second cell or to establishment of the second cell as the serving cell not being completed within a predetermined time period, data is transmitted through the first cell.

7. The mobile station of claim 1, wherein the mobile station transmits data through the first cell using the second frame size in response to the adjusting of the size of the frames by the adjustment module and once the second cell is established as a sewing cell, the mobile station transmits a last unacknowledged frame through the second cell using the first frame size.

8. The mobile station of claim 7, wherein the control stack informs the adjustment module in response to establishment of the second cell as the serving cell not being completed within a predetermined time period, or in response to establishment of the second cell as the serving cell being aborted, and the mobile station re-transmits a last unacknowledged frame through the first cell using the first frame size.

9. The mobile station of claim 1, wherein the second frame size corresponds to a payload size of a radio link control block on a per channel coding scheme basis and a statistically-determined value for frequently interchanged packets.

10. The mobile station of claim 1, wherein the second frame size is adjusted to a maximum size based on time remaining in the first cell, the time remaining in the first cell being determined by at least one of signal strength and amount of data remaining to be transferred.

11. A communication system including a plurality of cells defining corresponding radio coverage areas for transmitting data between a mobile station and a network, the communication system comprising:
   a base station located within each of the plurality of cells, the mobile station and the network receiving and transmitting data through the base station;
   a control stack organizing data within frames during data transmission between the mobile station and the network; and
   an adjustment module adjusting a size of the frames prior to reselection by the mobile station from a first cell of the plurality of cells to a second cell of the plurality of cells,
wherein, in response to the mobile station detecting that the second cell is a candidate for reselection, the control stack informs the adjustment module of a first frame size corresponding to transmission within the first cell and the adjustment module sets the size of the frames to a second frame size.

12. The communication system of claim 11, wherein data is transmitted through the first cell using the second frame size arid once the second cell is established as a serving cell, a last unacknowledged frame is transmitted through the second cell using the first frame size.

13. The communication system of claim 11, wherein the control stack informs the adjustment module in response to establishment of the second cell as a serving cell not being completed within a predetermined time period, or in response to establishment of the second cell as the serving cell being aborted, and a last unacknowledged frame is re-transmitted using the first frame size through the first cell.

14. A method of cell reselection during transmission of data through a serving cell, the method comprising the steps of:
   (a) transmitting data within frames having a first frame size through a first cell selected as the serving cell;
   (b) transmitting data within frames having a second frame size in response to detecting that a second cell is a candidate for reselection as the serving cell; and
   (c) transmitting data within frames having the first frame size in response to termination of a reselection process establishing the second cell as the serving cell, wherein the termination of the reselection process corresponds to one of completion of reselection to the second cell as the serving cell, aborting of reselection to the second cell as the serving cell, and establishment of the second cell as the serving cell not being completed within a predetermined time period.

15. The method of claim 14, wherein, in response to completion of reselection to the second cell, data is transmitted in step (c) through the second cell.

16. The method of claim 15, wherein, in response to aborting of reselection to the second cell and in response to establishment of the second cell as the serving cell not being completed within a predetermined time period, data is transmitted in step (c) through the first cell.

17. The method of claim 16, wherein the second frame size is 100 octets.

* * * * *